(12) United States Patent
Jurisch et al.

(10) Patent No.: US 11,547,095 B2
(45) Date of Patent: Jan. 10, 2023

(54) DEVICE AND METHOD FOR CONTROLLING A FLIGHT OPENING OF A BEEHIVE BOX

(71) Applicant: MICRO-SENSYS GMBH, Erfurt (DE)

(72) Inventors: Reinhard Jurisch, Bad Berka (DE); Peter Peitsch, Erfurt (DE); Jürgen Tautz, Waldbrunn (DE); Sylvo Jäger, Erfurt (DE)

(73) Assignee: MICRO-SENSYS GMBH, Erfurt (DE)

( * ) Notice: Subject to any disclaimer, the term of this patent is extended or adjusted under 35 U.S.C. 154(b) by 0 days.

(21) Appl. No.: 17/287,512

(22) PCT Filed: Oct. 21, 2019

(86) PCT No.: PCT/EP2019/078566
§ 371 (c)(1),
(2) Date: Apr. 21, 2021

(87) PCT Pub. No.: WO2020/083832
PCT Pub. Date: Apr. 30, 2020

(65) Prior Publication Data
US 2021/0386038 A1    Dec. 16, 2021

(30) Foreign Application Priority Data
Oct. 22, 2018   (DE) .................... 10 2018 126 176.4

(51) Int. Cl.
*A01K 11/00*  (2006.01)
*A01K 47/06*  (2006.01)
*A01K 49/00*  (2006.01)

(52) U.S. Cl.
CPC ............ *A01K 47/06* (2013.01); *A01K 11/006* (2013.01); *A01K 49/00* (2013.01)

(58) Field of Classification Search
CPC ...... A01K 11/006; A01K 47/00; A01K 47/06; A01K 49/00; A01K 57/00; A01K 1/0017; A01K 1/0023
(Continued)

(56) References Cited

U.S. PATENT DOCUMENTS 1,100,847 A * 6/1914 Schamu ................ A01K 47/06
                                                    449/21
1,103,468 A * 7/1914 Bachmann ............ A01K 47/00
                                                    449/37
(Continued)

FOREIGN PATENT DOCUMENTS

CZ       201757 A3     1/2018
DE    3727216 A1 *     2/1989
(Continued)

OTHER PUBLICATIONS

International Search Report, dated Dec. 2, 2019 for corresponding International Application No. PCT/EP2019/078566 with English translation.
(Continued)

Primary Examiner — Kathleen I Alker
(74) Attorney, Agent, or Firm — Intellectual Property Law Group LLP (57) ABSTRACT

The present disclosure relates to an arrangement (6) for controlling an entrance hole (2) of a beehive (1) of a beehive with bees, comprising a closure element (11) for at least partially closing the entrance hole (2). According to the present disclosure, the arrangement (6) comprises at least one identification unit (5) arrangeable or arranged on a queen bee (4), a reading unit (7) for reading out the at least one identification unit (5), wherein the reading unit (7) or at least one antenna unit (8) of the reading unit (7) is arrangeable or arranged at the entrance hole (2), and an actuation unit (12), in particular coupled with the reading unit (7), for
(Continued)

actuating the closure element (11). Moreover, the present disclosure relates to a method for controlling an entrance hole (2) of a beehive (1).

12 Claims, 6 Drawing Sheets (58) Field of Classification Search
USPC ......... 449/16, 20, 21, 24, 25, 1, 7, 8, 27, 28
See application file for complete search history.

(56) References Cited

U.S. PATENT DOCUMENTS

| | | | | |
|---|---|---|---|---|
| 5,067,441 | A * | 11/1991 | Weinstein | G08B 21/0263 340/573.3 |
| 5,653,192 | A * | 8/1997 | Sheen | A01K 1/12 119/51.02 |
| 6,111,508 | A * | 8/2000 | Ensor | A01K 11/006 340/573.2 |
| 10,514,439 | B2 * | 12/2019 | Seltzer | A01K 27/009 |
| 10,705,175 | B2 * | 7/2020 | Erad | G01S 3/043 |
| 2003/0034887 | A1 * | 2/2003 | Crabtree | G01S 3/54 340/568.1 |
| 2006/0252366 | A1 * | 11/2006 | Eu | E06B 7/32 455/3.06 |
| 2007/0207701 | A1 * | 9/2007 | Berry | A01K 49/00 449/3 |
| 2010/0295687 | A1 * | 11/2010 | Kuzniar | G06Q 10/08 340/573.3 |
| 2012/0326874 | A1 * | 12/2012 | Kwak | A01K 11/006 340/573.3 |
| 2017/0360010 | A1 * | 12/2017 | Wilson-Rich | H04Q 9/02 |
| 2019/0254260 | A1 * | 8/2019 | Nguyen | G07C 9/30 |
| 2020/0404883 | A1 * | 12/2020 | Abels | A01K 11/006 |

FOREIGN PATENT DOCUMENTS

| | | | | |
|---|---|---|---|---|
| DE | 202008004120 U1 * | 7/2008 | | A01K 11/006 |
| FR | 2914084 A1 * | 9/2008 | | A01K 1/0023 |
| GB | 578919 A * | 7/1946 | | |
| GB | 2468587 A * | 9/2010 | | A01K 1/0017 |
| KR | 101677420 B1 * | 11/2016 | | |
| KR | 20170017504 A * | 2/2017 | | |
| WO | WO-2014091365 A1 * | 6/2014 | | A01K 47/06 |
| WO | WO 2015/166292 A1 | 11/2015 | | |
| WO | WO 2016/120649 A2 | 8/2016 | | |
| WO | WO-2018104553 A1 * | 6/2018 | | A01K 47/00 |

OTHER PUBLICATIONS

Written Opinion of the ISA, dated Dec. 2, 2019 for corresponding International Application No. PCT/EP2019/078566.
Written Opinion of the ISA, dated Dec. 2, 2019 for corresponding International Application No. PCT/EP2019/078566 with English translation (12 pages).

* cited by examiner

DEVICE AND METHOD FOR CONTROLLING A FLIGHT OPENING OF A BEEHIVE BOX

CROSS-REFERENCE TO RELATED APPLICATIONS

This application is a U.S. National Phase application, under 35 U.S.C. § 371, of International Application no. PCT/EP2019/078566, with an international filing date of Oct. 21, 2019, and claims benefit of German Application no. 10 2018 126 176.4 filed on Oct. 22, 2018, each of which is hereby incorporated by reference for all purposes.

FIELD OF INVENTION

The present disclosure relates to an arrangement for controlling an entrance hole of a beehive having the features of the preamble of claim 1 and a method of controlling an entrance hole of a beehive.

BACKGROUND

It is generally known in the prior art to manually close the entrance hole of a beehive of a beehive with bees, for example in order to prevent the bees from flying out of the beehive during transport of the beehive with bees.

US 2007/0207701 A1 describes a system for proving the presence of a queen bee, in a hive. The system includes an RFID tag secured to the queen bee and a RFID detection device secured adjacent the hive opening that sends an output that indicates the presence or absence of the queen bee.

SUMMARY OF INVENTION

The object of the present disclosure is to provide an arrangement and a method for controlling an entrance hole of a beehive.

An arrangement for controlling an entrance hole of a beehive of a beehive with bees comprises for example a closure element configured as a flap for at least partially closing the entrance hole. The beehive which in colloquial language is also referred to as a beehive with bees, is an artificial housing for a bee colony, while the beehive with bees refers to the aggregate of the bee colony and the beehive.

According to the present disclosure, the arrangement comprises at least one identification unit arrangeable or arranged on a queen bee, a reading unit for reading out the at least one identification unit, wherein the reading unit or at least one antenna unit of the reading unit is arrangeable or arranged at the entrance hole, and an actuation unit for actuating the closure element. The actuation unit may be coupled with the reading unit.

A beehive may comprise such an arrangement. In particular, the reading unit or at least the antenna unit of the reading unit is arranged at the entrance hole; the closure element is arranged at the entrance hole, in particular in an opened or closed position; and the actuation unit for actuating the closure element which is in particular coupled with the reading unit, is provided. In an exemplary embodiment, the at least one identification unit is also provided and arrangeable or arranged on the queen bee.

A beehive with bees may comprise such an arrangement. In particular, the reading unit or at least the antenna unit of the reading unit is arranged at the entrance hole of the beehive; the closure element is arranged at the entrance hole of the beehive, in particular in an opened or closed position; and the actuation unit for actuating the closure element which is in particular coupled with the reading unit, is provided. An identification unit is arranged on at least one queen bee of the beehive with bees.

In a method for controlling the entrance hole of the beehive according to the present disclosure, in particular using said arrangement and/or using the beehive and/or using the beehive with bees, the identification unit arranged on the queen bee is read out by the reading unit which is arranged at the entrance hole or which comprises at least one antenna unit arranged at the entrance hole. This is only possible if the queen be is inside the beehive, i.e. in an interior space thereof, in the surrounding area of the reading unit. By said reading out of the identification unit it is determined that the queen bee is inside the beehive in the surrounding area of the entrance hole so that there is the risk that the queen bee leaves the beehive. Thereupon the closure element is moved to the closed position by actuation using the actuation element thus preventing the queen bee from leaving the beehive. Herein, actuation of the actuation element and thus actuation and consequently movement of the closure element to the closed position may be triggered by the reading unit, which may be coupled to the actuation element for this purpose as set forth above.

The solution according to the present disclosure allows for positively recognizing the at least one queen bee having the identification unit or multiple queen bees respectively having an identification unit if she/they is/are in the inner entrance hole area, i.e. in the surrounding area of the entrance hole inside the beehive, and subsequently allows for preventing her/them from leaving the beehive, in particular in a stress-free way. Thus, the solution according to the present disclosure, in particular in combination with the beehive, allows for creating a trap for the queen bee by which the queen bee can be reliably prevented from escaping from the beehive and thus from the beehive with bees.

In an exemplary embodiment, the at least one identification unit is configured as an RFID transponder, also referred to as an RFID tag, and the reading unit is configured as an RFID reading unit, also referred to as an RFID reader. Herein, the term RFID means "radio-frequency identification" and refers to a wireless data transmission method based on electromagnetic waves, i.e. a radio based date transmission method, for which an RFID transponder and a RFID reading unit are required. Herein, the RFID transponder is addressed by radios signals transmitted to the RFID transponder from the RFID reading device. Typically, the RFID transponder responds by transmitting a unique identification code and further information, if applicable. The object to which the respective transponder is secured, in this case the queen bee, is positively identifiable due to the unique identification code and, for example, further information transmitted by the RFID transponder may be positively assigned to the respective object. For example, for the presently described solution, all typical RFID transmission frequencies may be used, i.e. LF (Low Frequency), HF (High Frequency) and UHF (Ultra-High-Frequency).

For example, the reading unit comprises at least one RFID antenna unit having at least one RFID antenna or multiple, in particular two, RFID antennas, an RFID reading electronics unit and a controller, in particular for signal processing. Thus in particular, a reliable and individual recognition of the queen bee or the respective queen bee is facilitated. For example, every queen bee, or more precisely her respective RFID transponder, may get an original unique, i.e. in particular unambiguous, identification code, e.g. a number or identifier. This identification code may for example also be transmitted to a beekeeper and/or to a data base. This provides in particular the option to create a global unambiguous registration and identification of queen bees.

The identification code of the queen bee or the respective identification code of the respective queen bee, more precisely of her respective identification unit, which is in particular configured as an RFID transponder, may be stored in the reading unit, which is in particular configured as an RFID reading unit, in particular in a comparison memory. That is, the reading unit in particular includes such a comparison memory or is coupled, in particular directly coupled, in particular wired, to such a comparison memory, wherein an identification code of at least one identification unit is storable or stored in the comparison memory. In order to decide about the actuation of the closure element data communication with an external component is in particular not required. In an exemplary embodiment, in the method, the identification code is read from the identification unit of the queen bee and compared to one or more identification codes stored in the comparison memory, wherein for example, a successful reading out of the identification unit resulting in movement of the closure element to the closed position by actuation using the actuation element is present only if the identification code read from the identification unit matches with the identification code stored in the comparison memory or with one of the identification codes stored in the comparison memory. Thus, with a detected and read out identification unit configured as an RFID transponder and located in the inner entrance hole area, a comparison with the stored identification code or with the stored identification codes is possible within a very short time of e.g. a few milliseconds, thus facilitating a respectively fast detection of the queen bee and her presence in the inner entrance hole area. That is, the identification code read out from the identification unit located in the coverage area is compared with the identification code stored in the comparison memory or with the identification codes stored in the comparison memory. If the read out identification code matches with the identification code stored in the comparison memory or with one of the identification codes stored in the comparison memory, the closure element is actuated by the actuation unit, which may be actuated by the reading unit, and the closure element is thus moved to the closed position.

The described solution, in particular based on RFID, allows for an individual automatic recognition of the queen bee or of the respective queen bee and for an appropriate reaction, in particular by moving the closure element to the closed position. As the detection of the queen bee occurs in the inner entrance hole area, the reading unit and/or its antenna unit can be arranged such that the detection of the queen bee, more precisely her identification unit, is not affected by dirt and other environmental conditions.

In an exemplary embodiment, the antenna unit, comprising at least one antenna, in particular RFID antenna, or multiple, in particular two, antennas, in particular RFID antennas, of the reading unit is oriented such that a coverage area of the antenna unit stretches across a surrounding area of the entrance hole inside the beehive, in particular exclusively stretches across it. Thus it is ensured that the queen bee is detected if she enters this coverage area and thus the surrounding area of the entrance hole inside the beehive, and that only then, in particular precisely then, the closure element is reliably moved to the closed position. This prevents in a reliable and stress free way that the queen bee leaves the beehive.

In an exemplary embodiment, the antenna unit comprises at least two antennas, which are orientable or oriented such that the coverage areas, in particular a respective boundary of the coverage areas directed toward the interior of the beehive, of the antennas exhibit different distances to the entrance hole inside the beehive. In the method, as set forth above, the identification unit arranged on the queen bee is read out using the reading unit, if this queen bee is inside the beehive in the surrounding area of the entrance hole; and subsequently the closure element is moved to the closed position by actuating using the actuation element, but only if the identification unit arranged on the queen bee is read out first by the, in particular first, antenna whose coverage area, in particular its boundary directed toward the interior of the beehive, has the greater distance to the entrance hole, and then it is read out by the, in particular second, antenna whose coverage area, in particular its boundary directed toward the interior of the beehive, has the lesser distance to the entrance hole. That is, reading out the identification unit arranged on the queen bee using the reading unit and subsequent movement of the closure element to the closed position by actuation using the actuation element does not require only a single reading out by only one antenna of the antenna unit but requires a multiple, in particular double, sequential reading out by multiple, in particular two, antennas, namely first a reading out by the first antenna and then by the second antenna. Due to these two antennas which cover a graded area around the entrance hole inside the beehive, the reliability and quality of the detection is increased. It is thus in particular possible to detect the direction of movement of the queen bee, in particular to detect if the queen bee actually approaches the entrance hole, in particular to such an extent that there is a risk that the queen bee leaves the beehive. For example, if the identification unit arranged on the queen bee is read out by the first antenna, the arrangement will already be prepared for closing the closure element, and if the identification unit arranged on the queen bee is read out by the second antenna, the closure element is moved to the closed position.

In this context, the coverage area is configured in such a way, in particular by an appropriate configuration, setup and arrangement of the antenna unit, that a time period from a first detection of the queen bee, more precisely of her identification unit which is in particular configured as an RFID transponder, until arrival of the closure element in the closed position, is at least long enough that a stress-free prevention of the queen bee leaving the beehive is ensured. This time period and thus the configuration of the coverage area of the antenna unit or of the coverage areas of the antennas, in particular of the first antenna, of the antenna unit, in particular the distance by which this coverage area has to reach into the interior of the beehive starting from the entrance opening to detect the queen bee, more precisely her identification unit, in time, is calculated from a maximum required detection and comparison time multiplied by a movement velocity of the queen bee within the beehive, in particular within the beehive with bees. For example, a maximum possible or an average movement velocity of queen bees within beehives, in particular in beehives with bees, is used as this movement velocity. The coverage area of the antenna unit, in particular the first antenna of the antenna unit, which in case of two antennas extends further into the interior of the beehive, extends, starting from the entrance hole, in particular starting from the closure element positioned in the closed position, for example 3 cm to 5 cm into the interior of the beehive. The antenna unit may be configured, setup and arranged in such a way that such a surrounding area of the entrance hole is covered by its coverage area, in particular by the coverage area of the first antenna of the antenna unit. In an exemplary embodiment, the coverage area is not greater or not significantly greater, i.e. it does in particular not extend further or significantly further into the beehive in order to avoid unnecessary closing of the entrance hole.

In a possible embodiment, the arrangement comprises a blocking unit for blocking the closure element in the closed position. In the method, the closure element is accordingly blocked in the closed position, e.g. by the blocking unit. This prevents that the queen bee opens the closure element, which is for example configured as a flap, herself and leaves the beehive.

In a possible embodiment, the arrangement comprises a closure element position detection unit by which a current position of the closure element is detectable or by which is at least detectable whether the closure element is in the opened or closed position or by which is at least detectable whether the closure element is in the closed position or not. In the method, the closure element position detection unit is used to detect when the closure element is in the closed position. Thus it can be checked whether the beehive is reliably closed for the queen bee so that her escaping from the beehive and thus from the beehive with bees is reliably prevented.

In an exemplary embodiment, the arrangement comprises an alarm unit, also referred to as an alarm and information unit, for generating an alarm message if the at least one identification unit has been read out, in particular successfully read out, i.e. in particular if the correct identification code matching with the identification code stored in the comparison memory or with one of the identification codes stored in the comparison memory, has been read out and/or if the closure element is positioned in the closed position and for outputting and/or forwarding the alarm message generated. Accordingly, in the method, an alarm message may be generated and output and/or forwarded by this alarm unit if the at least one identification unit has been read out, i.e. in particular if the correct identification code matching with the identification code stored in the comparison memory or with one of the identification codes stored in the comparison memory has been read out, and thus upon detection of the queen bee in the inner entrance hole area and/or if the closure element is positioned in the closed position, in particular detected by the closure element position detection unit. For example, the alarm message is generated upon closing the entrance hole, i.e. for example after actuating the closure element by the actuation unit. The output of the alarm message can for example be optical, for example by a light signal, and/or acoustical. Forwarding the alarm message can be achieved in particular by radio transmission, i.e. in particular wireless, for example to a phone and/or another mobile device, in particular to a smart phone, and/or to a computer, in particular at a home or work place of a person responsible for the beehive, and/or to a network, in particular a so called cloud.

In order to ensure that the whole procedure is correct the alarm message may be generated and output or forwarded by the alarm unit only after unanimous identification of the queen bee, i.e. of her identification unit, in the inner entrance hole area, actuation of the closure element and the detection that the closure element is in the closed position. In the alternative, for example two alarm messages may be generated and output and/or forwarded, e.g. a first alarm message after unanimous identification of the queen bee, i.e. of her identification unit, in the inner entrance hole area, and a further alarm message after detecting that the closure element is in the closed position.

For example, the identification code of the queen bee, a positive identification code of the reading unit and/or of its antenna unit and the information of the closure element position detection unit regarding the position of the closure element, in particular together with the alarm message or as part of the alarm message, are submitted to a beekeeper to whom the beehive belongs. This information is for example linked to the current time in an information system of the beekeeper.

As set forth above, activation of the actuation unit for actuating the closure element to move it to the closed position may be triggered by the reading unit, thus ensuring a particularly prompt closing of the entrance hole after detection of the queen bee in the inner entrance opening area. In the alternative, it can be provided that the alarm message is generated and forwarded immediately after reading out the at least one identification unit and thus immediately after detecting the queen bee in the inner entrance opening area so that the actuation unit can be activated in response to this alarm message in order to actuate the closure element and thus move it to the closed position. A respective signal for activating the actuation unit can for example analogous to the forwarding of the alarm message, e.g. via a respective return channel. This signal may for example be automatically or manually triggered after receipt of the alarm message.

In a possible embodiment, the closure element comprises at least one passage opening, which is too small for the queen bee and which is sufficiently large for smaller bees, in particular workers and/or drones. That is, the passage opening is so small that the queen bee cannot pass and so large that the other bees, in particular workers and/or drones, can pass. For example, for dimensioning the passage opening, average sizes of bees and/or drones and/or queen bees determined for the beehive are used. In an exemplary embodiment, the closure element comprises multiple passage openings of this kind. By means of the passage opening or the multiple passage openings, smaller bees are enabled to keep on entering and leaving the beehive, even if the entrance hole is partially closed by means of the closure element, i.e. with the exception of the one or more passage openings, such that the queen bee cannot leave. Thus it is in particular ensured that the remaining bee colony is not affected or at least only affected to a very low extent by the closure element positioned in the closed position.

The above named components, in particular the antenna unit, RFID reading electronics unit, controller, comparison memory, actuation unit, closure element position detection unit, blocking unit and/or alarm unit may be integrated in the reading unit, in particular arranged in the reading unit or at least coupled thereto. For example, the reading unit comprises an energy supply connection for the electric energy supply and/or an integrated electric energy supply. The electric energy supply may for example take place by battery, by accumulator, by connection to an electric energy supply network, by a solar cell unit, by a wind generator unit and/or by a fuel cell unit. For example, the electric energy supply takes place by a combination of a solar cell unit and an accumulator. Herein, the solar cells are for example arranged on a roof of the beehive. Due to the accumulator which is charged by the solar cell unit, the function of the arrangement is ensured even in poor light conditions.

In an exemplary embodiment, a current state of the electric energy supply is monitored and related information is stored and/or forwarded, at least in case of deviation from predetermined values, for example to the beekeeper, in particular by radio transmission, for example via the connection which is also used to forward the alarm message. This allows for responding to problems in the energy supply in time.

The arrangement may for example be used in addition to a control of the bee flow, i.e. the inward flow and/or outward flow of the bees, at the entrance hole of the beehive. For this purpose, an identification unit, in particular an RFID transponder is arranged on each individual bee. In this case, the antenna unit may comprise multiple antennas, i.e. a plurality of antennas, which allow for recognizing the movement direction of the respective identification unit and thus of the respective bee, i.e. in particular if the movement occurs into the beehive or out of it. In this case, each bee may be positively identified, in particular based on its identification code of its identification unit, and the respective movement direction may be determined.

In this case, the closure element may be for example configured and actuatable by the actuation unit in such a way that the bee flow is controllable, e.g. by increasingly opening or closing the entrance hole by the closure element.

Several methods are possible for simply, reliably and optimally programming the comparison memory of the reading unit. For example, the arrangement comprises a so called master card, in particular UHF master card, in addition to the at least one identification unit configured as an RFID transponder, in particular UHF transponder. If this master card is read in by the reading unit, the reading unit is set into a so called programming mode which allows for teaching the identification units into the comparison memory, deleting the identification units from the comparison memory and/or deleting the entire comparison memory. These procedures are referred to as TEACH_IN, TEACH_OUT and CLEAR_ALL.

For example, such a master card allows teaching a predetermined maximum number of identification units in the comparison memory of the reading unit. In this case, this predetermined maximum number of teachable identification units may be stored on the master card. This kind of configuration of the comparison memory requires no further communication interface at the reading unit in addition to the RFID interface which is present anyway.

The correct teaching of the identification units may for example be optically visualized, e.g. by light signals, for example by LEDs. The content of the comparison memory may optionally be transferred via one or more further communication interfaces, e.g. WiFi and/or Bluetooth and/or BLE (Bluetooth Low Energy).

Alternatively or additionally, programming, in particular teaching of the identification units into the comparison memory, deleting from the comparison memory and/or deleting the comparison memory occurs for example wirelessly via BLE and by means of an App, i.e. by means of a program, on a mobile phone, in particular smart phone, or another mobile device, which allows this.

Alternatively or additionally, programming, in particular teaching of the identification units into the comparison memory, deleting from the comparison memory and/or deleting the comparison memory occurs for example wirelessly via WiFi and by means of an App, i.e. by means of a program, on a mobile phone, in particular smart phone, or another device, in particular mobile device, and/or computer which allows this.

In the alternative, the arrangement comprises at least one identification unit configured as an RFID transponder, in particular UHF transponder, and an NFC transponder, e.g. as a set and pre-programmed. This is an alternative to the teaching via the master card. The NFC transponder is read in at the mobile phone, in particular smart phone, or at another mobile device and the ID number corresponding to the one of the UHF transponder included in the set is for example transmitted via BLE (Bluetooth Low Energy) into the comparison memory.

In the alternative to the RFID based solution, i.e. to the configuration of the identification unit as an RFID transponder and to the configuration of the reading unit as an RFID reading unit, other solutions are also possible, e.g. analogous to an electronic article surveillance system, with an appropriately configured identification unit and reading unit. In this case, unanimous identification is not possible though; however if only the queen bee or the respective queen bee has such an identification unit, the presence of the queen bee in the inner entrance hole area can likewise be detected.

In an exemplary embodiment, the arrangement comprises at least one temperature sensor for determining a temperature in the beehive, in particular in the beehive with bees, and/or outside the beehive. The at least one temperature sensor is for example arranged in the reading unit or coupled with it or configured as an RFID temperature sensor transponder. This way it can be ensured that upon activation of the actuation unit for actuating the closure element in order to move it into the closed position, the temperature in the beehive, in particular in the beehive with bees, and/or outside the beehive may be taken into account. In order to ensure that the bees may escape from the beehive in case of emergency, the actuation is for example only activated at a temperature in the beehive, in particular in the beehive with bees, and/or outside the beehive below a predetermined maximum temperature.

The actuation unit for actuating the closure element to move it into the closed position may for example be configured as a locking unit for locking the closure element in the opened position, which is unlocked by the activation, e.g. comprising a solenoid which is supplied with a current for locking or unlocking. Supplying with a current for unlocking comes with the benefit that no permanent current supply of the solenoid is required in order to keep it in the locked state. For example, this locking unit comprises a permanent magnet locking the closure element in the opened position and the solenoid which, when in the state supplied by a current, works against the magnetic field of the permanent magnet and thus compensates it so that the closure element is unlocked. Other lockings are likewise possible.

For example, in this case it can be provided that the closure element is exclusively moved into the closed position by gravity, i.e. by the earth's gravitational force. For example, the closure element is configured as a flap which falls down after unlocking and thus closes. Alternatively or additionally at least one spring element may for example be provided which is pretensioned in the opened position of the closure element so that the closure element is moved into the closed position by the spring force of the spring element.

In the alternative, the actuation unit can for example be configured as a motor by which the closure element is moved into the closed position. This comes with the benefit that the closure element may also be moved back into the opened position, for example automatically or manually.

Thus, the actuation unit may comprise an actor, for example in the form of the motor or the solenoid or another actor, in order to actuate the closure element, in particular in the above described way.

If heating of the reading unit or at least components of the heating unit can occur during operation of the reading unit, the reading unit or these components may be arranged at the beehive in such a way that this heating has no effect or at least only a small, in particular negligible, effect on the temperature inside the beehive in order to avoid affecting a behavior of the bees. For example, the reading unit or at least the components heating up are at least partially arranged on the outside of the beehive and/or a cooling device and/or a heat dissipation device for dissipating the heat of the reading unit or of the components heating up outwards, i.e. to the outer surroundings of the beehive, is provided.

In an exemplary embodiment, the antenna unit is upgradable by one or more further antennas, in particular RFID antennas, e.g. by a plug-on option in the antenna unit and corresponding pluggable antennas. This additional antenna or additional antennas may for example be used to detect the position of the queen bee or queen bees in the beehive, in particular in the beehive with bees, and/or to read out one or more sensor transponders, in particular temperature sensor transponders.

For example, the arrangement may comprise one or more sensor transponders which may be read out by the reading unit. For example, using such sensor transponders the temperature in the beehive, in particular in the beehive with bees, and/or outside the beehive, a relative air humidity inside and/or outside the beehive, in particular the beehive with bees, and/or lighting conditions inside and/or outside the beehive, in particular the beehive with bees, and/or one or more events, e.g. opening of the beehive, may be detected and for example also be recorded and/or forwarded, e.g. in the form of an according alarm message.

This arrangement, in particular the reading unit, may for example comprise one or more data interfaces, in particular for programming and/or reading out information, in particular in addition to the RFID interface which is present anyway in a configuration as an RFID reading unit, for example a USB connection and/or a BLE interface and/or an NFC interface, for example for establishing a connection to a smart phone or another device. In an exemplary embodiment, corresponding application software is also provided.

In an exemplary embodiment, the arrangement is configured in a modular way, for example in the form of a basic module having a basic function which may be combined with one or more further modules and/or which allows for installing and/or unlocking one or more further functions.

The arrangement is in particular provided to be applied by beekeepers; however, alternatively or additionally, it can for example also be applied for behavioral studies of bees, for example to investigate when the bees are swarming and to investigate predictors for the swarming.

The identification unit which is in particular configured as an RFID transponder has for example a weight of less than 5 milligrams and/or a maximum size of 2 mm×2 mm auf, for example a maximum length of 1.7 mm, a maximum width of 1.7 mm and a maximum height of 0.6 mm. The RFID-Transponder has for example a working frequency of 900 MHz or at least about 900 MHz (UHF).

BRIEF DESCRIPTION OF THE DRAWINGS

In the following, embodiments of the present disclosure are explained in more detail referring to drawings.

Corresponding parts are given the same reference signs in all figures.

DETAILED DESCRIPTION OF SPECIFIC EMBODIMENTS

Figure 1:
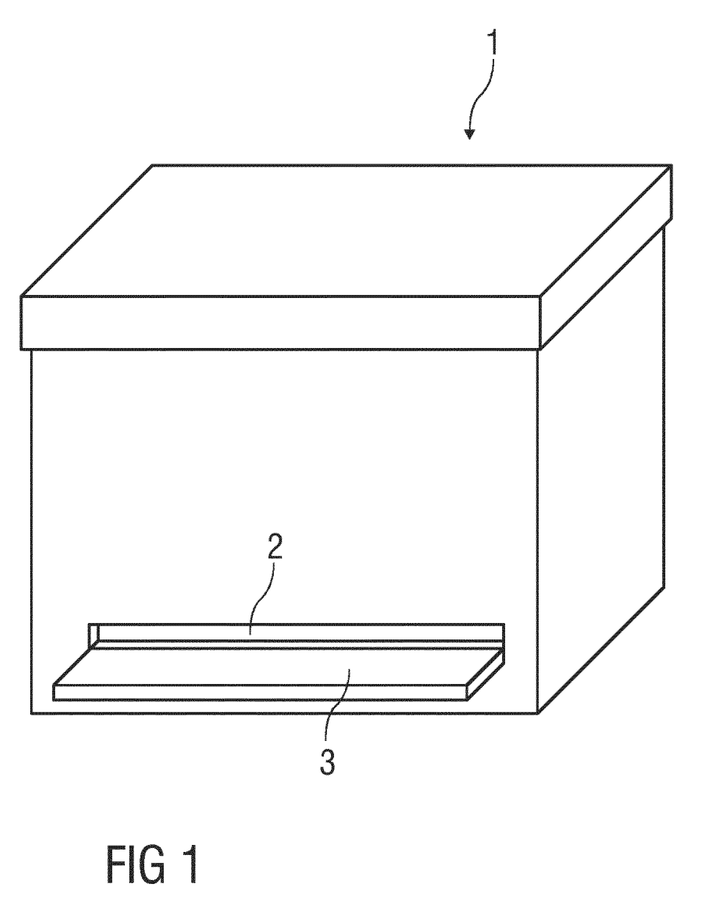
FIG. 1 is a schematic perspective view of an embodiment of a beehive for a beehive with bees.

FIG. 1 shows a beehive 1 for a beehive with bees. Herein, an artificial housing for a bee colony is referred to as the beehive 1, while the beehive with bees refers to the aggregate of the beehive 1 and the bee colony located therein.

For example, honeycombs and the bee colony (not shown in detail here) are located inside the beehive 1 shown here.

The beehive 1 comprises an entrance hole 2, through which bees of the beehive with bees may enter or leave the beehive 1. At an outer side of the beehive 1 below the entrance hole 2, a landing spot 3 is provided for the bees.

Figure 2:
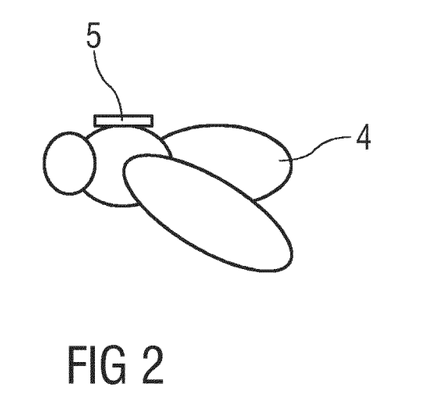
FIG. 2 is a schematic lateral view of a queen bee.

FIG. 2 shows a queen bee 4 of the beehive with bees, i.e. the bee colony, in the beehive 1. The queen bee 4 has an identification unit 5 configured as an RFID transponder, which may for example be secured to the queen bee 4 by glue.

Figure 5:
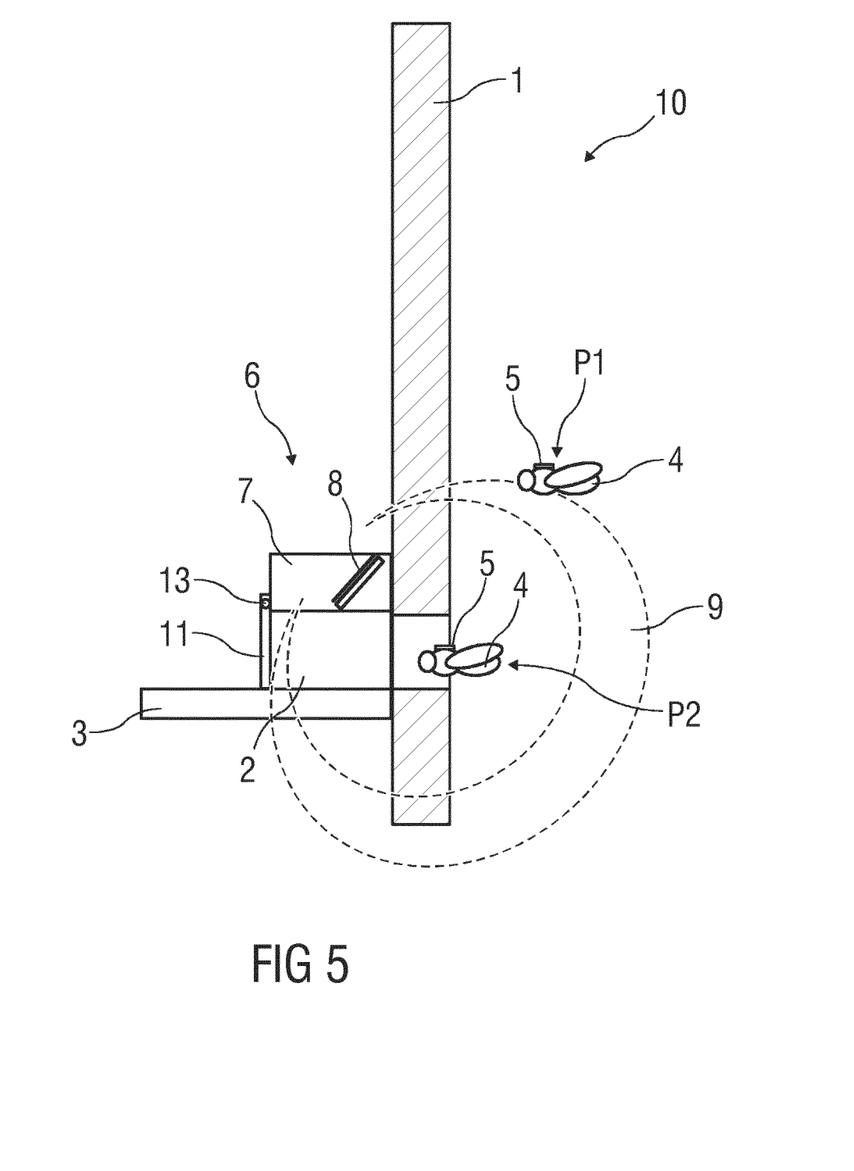
FIG. 5 is a schematic sectional view of an entrance hole area of a further embodiment of a beehive for a beehive with bees.
Figure 8:
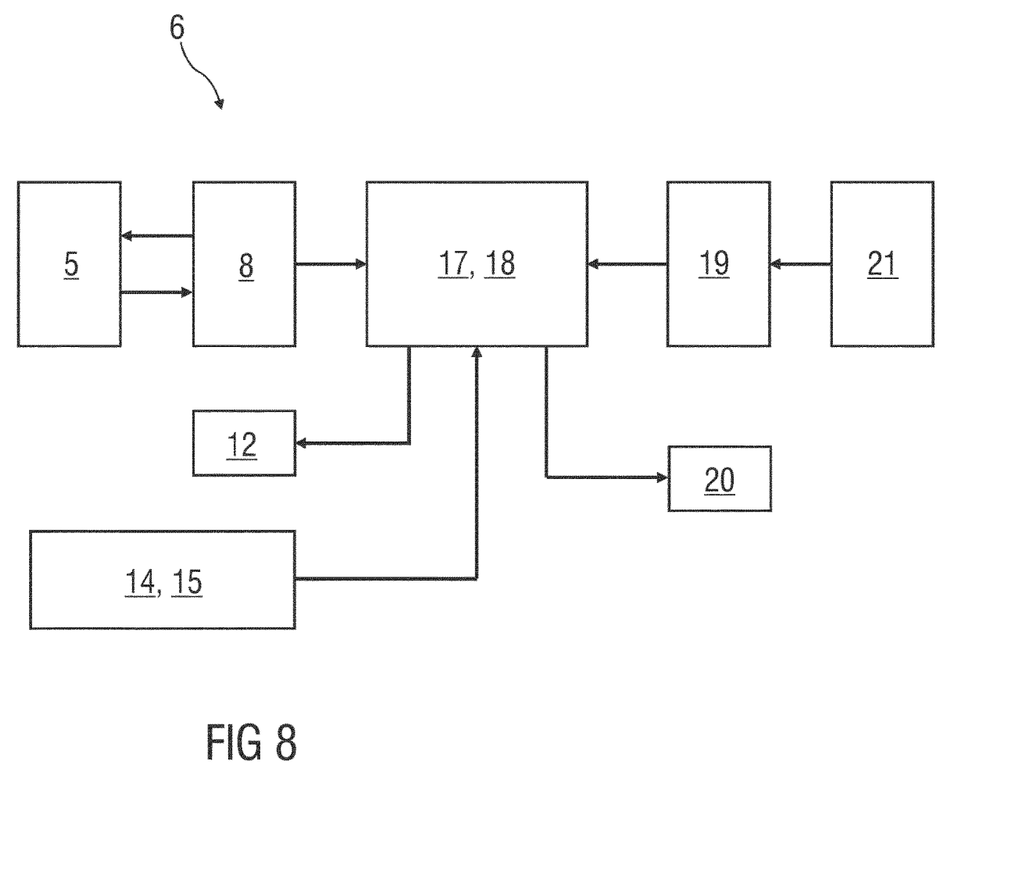
FIG. 8 is a schematic view of an arrangement for controlling an entrance hole of a beehive for a beehive with bees.

The identification unit is part of an arrangement 6 for controlling the entrance hole 2 of the beehive 1 of the beehive with bees shown in FIG. 5 and FIG. 8. By means of this arrangement 6 it is possible to prevent the queen bee 4 from leaving the beehive 1 so that the arrangement 6 in combination with the beehive 1 forms a trap for queen bees.

Figure 3:
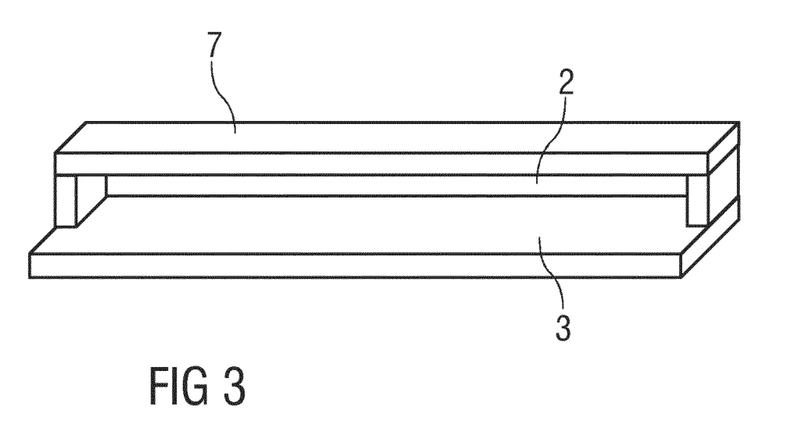
FIG. 3 is a schematic perspective view of an entrance hole area of a further embodiment of a beehive for a beehive with bees.
Figure 4:
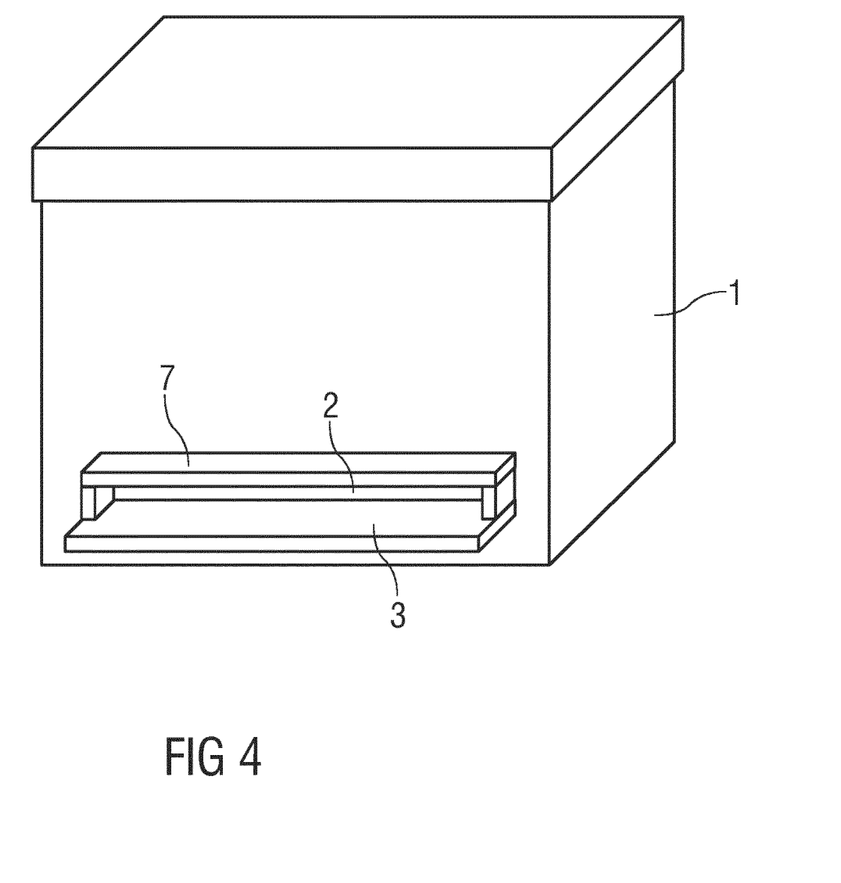
FIG. 4 is a schematic perspective view of the embodiment of the beehive for the beehive with bees having the entrance hole area of FIG. 3.

In order to facilitate this, the arrangement 6 comprises, as shown in FIG. 3, a reading unit 7 configured as an RFID reading unit for reading out the at least one identification unit 5 which in the illustrated embodiment is arranged at the entrance hole 2. FIG. 4 show the beehive 1 with the reading unit 7. Here, the reading unit 7 is arranged above the entrance hole 2 at the beehive 1.

FIG. 5 shows a sectional view of the beehive 1 in the area of the entrance hole 2. It may be seen here that the reading unit 7 comprises an antenna unit 8 configured as an RFID antenna unit having at least one antenna configured as an RFID antenna. This antenna unit 8 of the reading unit 7 is oriented such that a coverage area 9 of the antenna unit 8 framed by dashed lines stretches across an inner entrance hole area, i.e. a surrounding area of the entrance hole 2 inside, i.e. in an interior space 10, of the beehive 1. This allows for detecting and reading out the identification unit 5 by means of the reading unit 7 if the queen bee 4 approaches the entrance hole 2 from inside, i.e. in the interior space 10 of the beehive 1, as shown by the queen bee 4 being in a first position P1. This way the approaching of the queen bee 4 to the entrance hole 2 from the inside can be detected.

In order to prevent that the queen bee 4 leaves the beehive 1, for example to prevent that she establishes a new beehive with bees outside the beehive 1 in an unregulated way, the arrangement 6 comprises a closure element 11 for at least partially closing the entrance hole 2. This closure element 11 is configured as a closure flap here, which pivots about a pivot axis 13 from the opened position into the closed position shown in FIG. 5.

In order to actuate the closure element 11 to move it into a closed position shown in FIG. 5 in which it closes the entrance hole 2 at least in part, the arrangement 6 comprises an actuation unit 12 which may be coupled with the reading unit 7, e.g. integrated with the reading unit 7. The actuation unit 12 may for example be configured as an actor or comprise an actor, e.g. an electric motor. Thus, the closure element 10 may be for example moved both into the closed position and back into the opened position using the actuation unit 12.

In the alternative, the actuation unit 12 may for example be configured as a locking unit locking the closure element 11 in the opened position and actuating it by unlocking the closure element 11, wherein the closure element 11 then automatically moves into the closed position, in particular by gravity, i.e. by the earth's gravitational force, into the closed position, in particular in the configuration as a flap shown here, and/or for example by the spring force of at least one tensioned spring element.

Thus, when the queen bee 4 moves from inside the beehive 1 toward the entrance hole 2 and reaches the coverage area 9, the identification unit 5 is read out by the reading unit 7 and the queen bee 4 is thus identified and it is detected that she is moving toward the entrance hole 2. Subsequently, the actuation unit 12 is activated which actuates the closure element 11 and thus moves it into the closed position, either by active movement or at least by unlocking using the actuation unit 12. As shown in FIG. 5, the closure element 11 has reached the closed position and thus closed the entrance hole 2 for the queen bee 4 before the queen bee 4 has moved through the entrance hole 2 as shown in FIG. 5 by the queen bee 4 now being in a second position P2 in the entrance hole 2.

Figure 6:
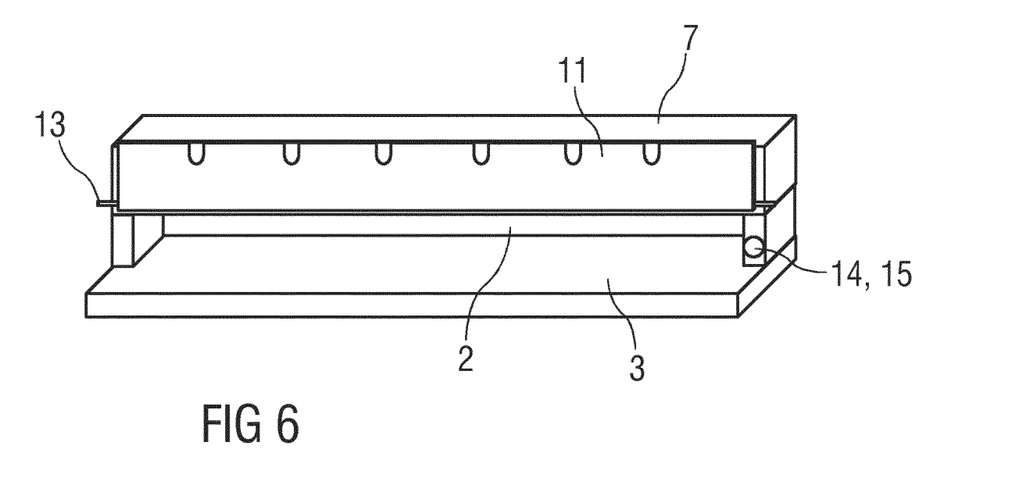
FIG. 6 is a schematic perspective view of the entrance hole area of FIG. 5 with a closure element in an opened position.
Figure 7:
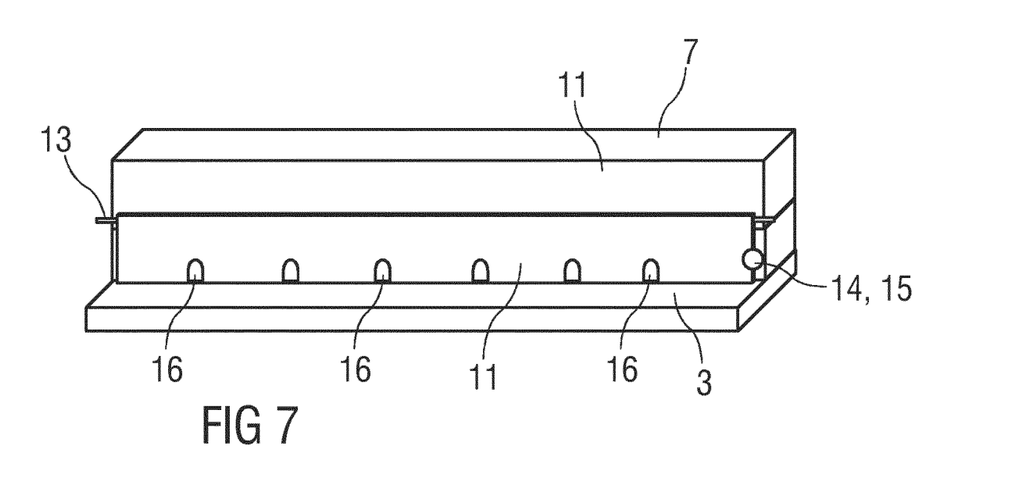
FIG. 7 is a schematic perspective view of the entrance hole area of FIG. 5 with a closure element in an closed position.

FIG. 6 shows the closure element 11 in the opened position. FIG. 7 shows the closure element 11 in the closed position.

In the shown embodiment, the arrangement 6 further comprises a blocking unit 14 for blocking the closure element 11 in the closed position and a closure element position detection unit 15 for detecting the position of the closure element 11, by means of which it can at least be determined if the closure element 11 is in the closed position or not. In the shown example the blocking unit 14 and the closure element position detection unit 15 are configured as a joint unit. In other examples they may also be configured as separate independent units.

The closure element 11 comprises at least one passage opening 16 which is too small for the queen bee 4 and which is sufficiently large for smaller bees, in particular workers and/or drones. In the shown example, the closure element 11 comprises multiple passage openings 16 of this kind. Thus it is ensured that smaller bees, in particular the workers and/or drones, are enabled to keep on entering and leaving the beehive 1, even if the entrance hole 2 is in the closed state by the closure element 11, with the exception of the passage openings 16.

FIG. 8 shows the arrangement 6 with its components. As described above, the arrangement 6 comprises the identification unit 5 and the reading unit 7. The reading unit 7 comprises at least the antenna unit 8 having at least one RFID antenna, an RFID reading electronics unit 17 and a controller 18, in particular for signal processing.

The arrangement 6 furthermore comprises a comparison memory 19 in which one or more identification codes of one or more identification units 5 to be detected are stored, the actuation unit 12 which is for example configured as an actor, the closure element position detection unit 15 which is for example configured as a sensor, an alarm unit 20, also referred to as an alarm and information unit, for generating an alarm message if the at least one identification unit 5 has been read out, in particular successfully read out, i.e. in particular if the correct identification code matching with the identification code stored in the comparison memory 19 or with one of the identification codes stored in the comparison memory 19, has been read out and/or if the closure element 11 is positioned in the closed position and for outputting and/or forwarding the alarm message generated. Furthermore, the arrangement 6 in the shown example comprises contactless programming electronics 21.

For example, the above named components, in particular the antenna unit 8, RFID reading electronics unit 17, controller 18, comparison memory 19, actuation unit 12, closure element position detection unit 15, blocking unit 14 and/or alarm unit 20 are integrated in the reading unit 7, in particular arranged in the reading unit 7 or at least coupled thereto. The programming electronics 21 may for example have components integrated in the analysis unit 7 and/or being external.

In a method for controlling the entrance hole 2 of the beehive 1, in particular using this arrangement 6, the identification unit 5 arranged on the queen bee 4 is read out using the reading unit 7 arranged at the entrance hole 2. This is only possible if the queen bee 4 is located inside, i.e. in the interior space 10, of the beehive 1 in the surrounding area of the entrance hole 2 and thus in the coverage area 9 of the reading unit 7. By said reading out of the identification unit 5 it is thus determined that the queen bee 4 is inside the beehive 1 in the surrounding area of the entrance hole 2 so that there is the risk that the queen bee 4 leaves the beehive 1. Thereupon the closure element 11 is moved to the closed position by actuation using the actuation element 12 thus preventing the queen bee 4 from leaving the beehive 1. Herein, actuation of the actuation element 12 and thus actuation and consequently movement of the closure element 11 to the closed position may be triggered by the reading unit 7, which may be coupled to the actuation element 12 for this purpose as set forth above.

The identification code of the queen bee 4 or the respective identification code of the respective queen bee 4, more precisely of her respective identification unit 5 which is configured as an RFID transponder, is stored in the reading unit 7 in particular in the comparison memory 19. Thus, with a detected and read out identification unit 5 configured as an RFID transponder and located in the inner entrance hole area, a comparison with the stored identification code or with the stored identification codes is possible within a very short time of e.g. a few milliseconds, thus facilitating a respectively fast detection of the queen bee 4 and her presence in the inner entrance hole area.

After the closure element 11 has been moved into the closed position it will be blocked by the blocking unit 14 and the closure element position detection unit 15 detects that the closure element 11 is in the closed position. Then, an alarm message is generated by the alarm unit 20 and output optically, e.g. by LEDs (light emitting diodes) and/or acoustically and/or forwarded.

In order to ensure that the whole procedure is correct the alarm message may be generated and output or forwarded by the alarm unit 20 only after unanimous identification of the queen bee 4, i.e. of her identification unit 5, in the inner entrance hole area, actuation of the closure element 11 and the detection that the closure element 11 is in the closed position. In the alternative, for example two alarm messages may be generated and output and/or forwarded, e.g. a first alarm message after unanimous identification of the queen bee 4, i.e. of her identification unit 5, in the inner entrance hole area, and a further alarm message after detecting that the closure element 11 is in the closed position.

For example, the identification code of the queen bee 4, a positive identification code of the reading unit 7 and/or of its antenna unit 8 and the information of the closure element position detection unit 15 regarding the position of the closure element 11, in particular together with the alarm message or as part of the alarm message, are submitted to a beekeeper to whom the beehive with bees belongs. This information is for example linked to the current time in an information system of the beekeeper.

For example, the reading unit 7 comprises an energy supply connection for the electric energy supply and/or an integrated electric energy supply. The electric energy supply may for example take place by battery, by accumulator, by connection to an electric energy supply network, by a solar cell unit, by a wind generator unit and/or by a fuel cell unit. For example, the electric energy supply takes place by a combination of a solar cell unit and an accumulator. Herein, the solar cells are for example arranged on a roof of the beehive 1. Due to the accumulator which is charged by the solar cell unit, the function of the arrangement 6 is ensured even in poor light conditions.

In an exemplary embodiment, a current state of the electric energy supply is monitored and related information is stored and/or forwarded, at least in case of deviation from predetermined values, for example to the beekeeper, in particular by radio transmission, for example via the connection which is also used to forward the alarm message. This allows for responding to problems in the energy supply in time.

For a simple, reliable and optimal programming of the comparison memory 19 of the reading unit 7, in particular by means of the programming electronics 21, several methods are possible.

For example, the arrangement 6 comprises a so called master card, in particular UHF master card, in addition to the at least one identification unit 5 configured as an RFID transponder, in particular UHF transponder. If this master card is read in by the reading unit 7, the reading unit 7 is set into a so called programming mode which allows for teaching the identification units into the comparison memory 19, deleting the identification unit 5 from the comparison memory 19 and/or deleting the entire comparison memory 19. These procedures are referred to as TEACH_IN, TEACH_OUT and CLEAR_ALL.

For example, such a master card allows teaching a predetermined maximum number of identification units 5 in the comparison memory 19 of the reading unit 7. In this case, this predetermined maximum number of teachable identification units 5 may be stored on the master card. This kind of configuration of the comparison memory 19 requires no further communication interface at the reading unit 7 in addition to the RFID interface which is present anyway.

The correct teaching of the identification units 5 may for example be optically visualized, e.g. by light signals, for example by LEDs. The content of the comparison memory 19 may optionally be transferred via one or more further communication interfaces, e.g. WiFi and/or Bluetooth and/or BLE (Bluetooth Low Energy).

Alternatively or additionally, programming, in particular teaching of the identification units 5 into the comparison memory 19, deleting from the comparison memory 19 and/or deleting the comparison memory 19 occurs for example wirelessly via BLE and by means of an App, i.e. by means of a program, on a mobile phone, in particular smart phone, or another mobile device, which allows this.

Alternatively or additionally, programming, in particular teaching of the identification units 5 into the comparison memory 19, deleting from the comparison memory 19 and/or deleting the comparison memory 19 occurs for example wirelessly via WiFi and by means of an App, i.e. by means of a program, on a mobile phone, in particular smart phone, or another device, in particular mobile device, and/or computer which allows this.

In the alternative, the arrangement 6 comprises at least one identification unit 5 configured as an RFID transponder, in particular UHF transponder, and an NFC transponder, e.g. as a set and pre-programmed.

LIST OF REFERENCES

1 beehive
2 entrance hole
3 landing spot
4 queen bee
5 identification unit
6 arrangement
7 reading unit
8 antenna unit
9 coverage area
10 interior
11 closure element
12 actuation unit
13 pivot axis
14 blocking unit
15 closure element position detection unit
16 passage opening
17 RFID reading electronics unit
18 controller
19 comparison memory
20 alarm unit
21 programming electronics
P1 first position
P2 second position

The invention claimed is:

1. An arrangement for controlling an entrance hole of a beehive, the arrangement comprising:
  a closure configured to at least partially close the entrance hole,
  at least one identifier arrangeable on a queen bee,
  a reader configured to read out the at least one identifier, the reader having at least one antenna assembly, wherein the at least one antenna assembly is arranged at the entrance hole, and
  an actuator configured to actuate the closure;
  wherein the actuator is coupled with the reader, and
  wherein the at least one antenna assembly is oriented such that a coverage area of the at least one antenna assembly stretches across an area inside the beehive surrounding the entrance hole.

2. The arrangement according to claim 1, wherein the at least one identifier is configured as an RFID transponder and the reader is configured as an RFID reader.

3. The arrangement according to claim 1, further comprising a comparison memory, which is one of comprised in the reader and coupled to the reader, wherein an identification code of the at least one identifier is storable in the comparison memory.

4. The arrangement according to claim 1, wherein the at least one antenna assembly comprises at least two antennas, which are oriented such that the coverage areas of the antennas have different distances inside the beehive to the entrance hole.

5. The arrangement according to claim 1, further comprising a blocking device for blocking the closure in a closed position.

6. The arrangement according to claim 5, further comprising an alarm device configured to generate an alarm message and to at least one of output and forward the alarm message generated if one or more of the following conditions apply:

the at least one identifier has been read out, and the closure is positioned in the closed position.

7. The arrangement according to claim 1, further comprising a closure position detector.

8. The arrangement according to claim 1, wherein the closure comprises at least one passage opening, which is too small for the queen bee and which is sufficiently large for smaller bees including at least one of workers and drones.

9. The arrangement according to claim 1, wherein the coverage area of the at least one antenna assembly stretches 3 cm to 5 cm into the beehive.

10. The arrangement according to claim 1, further comprising an energy supply, wherein the energy supply comprises a combination of a solar cell unit and an accumulator.

11. The arrangement according to claim 1, wherein the actuator is configured as a locking unit for locking the closure in an opened position, and wherein the closure is unlocked by an activation via supplying a current.

12. The arrangement according to claim 1, further comprising a temperature sensor.

* * * * *